United States Patent [19]

Arnason et al.

[11] Patent Number: 4,471,450

[45] Date of Patent: Sep. 11, 1984

[54] REGISTER POSITION SENSING AND CONTROLLING APPARATUS

[75] Inventors: John D. Arnason, Toronto; Michael J. Hampton, Agincourt; Carl M. Terrier, Scarborough, all of Canada

[73] Assignee: Schlumberger Canada Limited, Toronto, Canada

[21] Appl. No.: 344,323

[22] Filed: Feb. 1, 1982

[51] Int. Cl.³ ............................................. G08C 9/02
[52] U.S. Cl. ............................... 364/559; 340/347 P; 340/870.37; 377/17
[58] Field of Search ................. 364/559; 340/347 P, 340/870.02, 870.21, 870.31, 870.37; 377/17, 24

[56] References Cited

U.S. PATENT DOCUMENTS

| | | | |
|---|---|---|---|
| 3,198,937 | 8/1965 | Wooster | 340/347 P |
| 3,729,728 | 4/1973 | Hardway, Jr. | 340/347 P |
| 3,760,392 | 9/1973 | Stich | 340/870.37 |
| 3,766,544 | 10/1973 | Batz | 340/347 P |
| 4,233,593 | 11/1980 | Bigelow | 340/870.37 |
| 4,238,781 | 12/1980 | Vercellotti et al. | 340/870.37 |

Primary Examiner—Gary Chin
Attorney, Agent, or Firm—Dale Gaudier

[57] ABSTRACT

A visually and electronically readable motor driven register has a plurality of dependently rotatable, coaxial, incrementally positionable, number wheels which each carry a movable electrode fixed in a predetermined position relative to the numbers on each wheel. Adjacent each movable electrode is inserted a fixed plate which carries a plurality of stationary electrodes, each corresponding to a number on the wheel and disposed circumferentially around a stationary main electrode which is capacitively coupled to the movable electrode. When a number on a wheel is visually readable, the movable electrode will be positioned so as to be capacitively coupled only to the stationary electrode corresponding to the readable number. A microprocessor provides pulses sequentially to the stationary electrodes of each wheel, and checks for a coincident processed output from the main electrode of the first wheel. If there is a processed output indicating capacitive coupling between stationary and movable electrodes, the microprocessor retains the electrode number indicative of the readable number of the first wheel and checks for a coincident processed output from the main electrode of the second wheel. When all the wheels have been read, the first wheel is again checked; if all the wheels have not been able to be read, the microprocessor will activate the motor to move the wheels until they can all be read.

9 Claims, 16 Drawing Figures

REGISTER POSITION SENSING AND CONTROLLING APPARATUS

FIELD OF THE INVENTION

The invention relates generally to apparatus for sensing and controlling position of a member. The apparatus is especially intended for obtaining an electronic indication of the position of the number wheels in a cyclometer register.

BACKGROUND OF THE INVENTION

Demand meters are used in the electric utility industry to measure the maximum rate of energy used averaged over a given time. In the past, the devices have been complex, mechanical or thermal devices and have had two primary requirements for displays which wwere that (1) they provide a rugged, reliable display of the quantity measured, and (2) the display be nonvolatile so that the removal of power did not cause loss of the information displayed.

Recently, electronic components have come into use which allow demand meters which offer greater resolution at less cost, however, the display and nonvolatile memory requirements are not well served by conventional purely electronic systems.

Various systems developed in the past to meet the requirements have been complex and costly. Among the various types developed are those position sensors that produce electrical outputs having a magnitude or waveform related to the angular displacement of the movable member such as those shown in the U.S. Pat. No. 3,702,467 granted to Melnyk and U.S. Pat. No. 3,873,916 granted to Sterki. Other tyes of sensors have relied on converting an analog signal corresponding to the position of the movable member and converting it into a digital code representative of the angular position such as the U.S. Pat. No. 3,238,523 granted to Masel, et al. Finally, very complex signal related systems have been used in which the electrical output has a phase angle related to the angular displacement such as those exemplified by U.S. Pat. No. 4,007,454 granted to Cain, et al and U.S. Pat. No. 4,238,782 granted to Ogasawara.

While systems in the past have relied on wedge-type capacitive sensors, relatively complex circuitry was required to provide the proper series of input signals and/or for processing the sensor output signals to provide complex, final output signals.

In the U.S. Pat. No. 3,198,937 granted to Wooster which is a digital to digital converter, reference signals of progressively different phases were generated simultaneously and simultaneously provided to the different electrodes around a shaft whose angular position was to be determined. The sensor output signal was then provided to a phase comparator along with all the reference signals to be compared so a signal could be generated to cause angular rotation of another shaft.

In the U.S. Pat. No. 3,766,544 granted to Batz which is an analog to digital converter, sequential encoded sets of reference signals having two phases are provided to all the different electrodes around a continuously running shaft. The sensor output signals are then compared with the time sequence of the encoded reference signals to provide the angular position at the time the reference signals were provided.

None of the above systems provided a straight forward digital to digital system of sensing the position of the wheels of a cyclometer or the pointers of a dial register.

SUMMARY OF THE INVENTION

The present invention provides a register position sensing system particularly suitable for remotely reading meters having wheel type registers.

The present invention further provides a straight forward device for obtaining a digital output indicative of the digital position of a nonvolatile, cyclometer register number wheel. Each wheel is provided with a secured electrode which moves with the wheel and is capacitively coupleable with ten stationary, circumferentially-arranged, dielectric-film-covered electrodes which are individually pulsed by a microprocessor. As long as there is no correlation between the circumferential electrodes and the number which is to be read off the wheel, there is no output. When the circumferential electrode which relates to the appropriate number receives the pulse, the capacitive coupling effect on the movable electrode is transferred to a main electrode in the center of the ten electrodes. From the main electrode a response pulse is transmitted to a first processing circuit which buffers the differentiated signal and then level detects it to provide a processed pulse which, when received by the microprocessor coincidentally with the original pulse, digitally determines the position of the number wheel. While the circumferential electrodes continue to be pulsed, the microprocessor is then set to sense for a processed pulse from the next processing circuit related to the next wheel.

The present invention further provides for using the motor to move the wheels in the event that the numbers on wheels cannot all be read because the exposed surface of one of the wheels is positioned between successive numbers.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
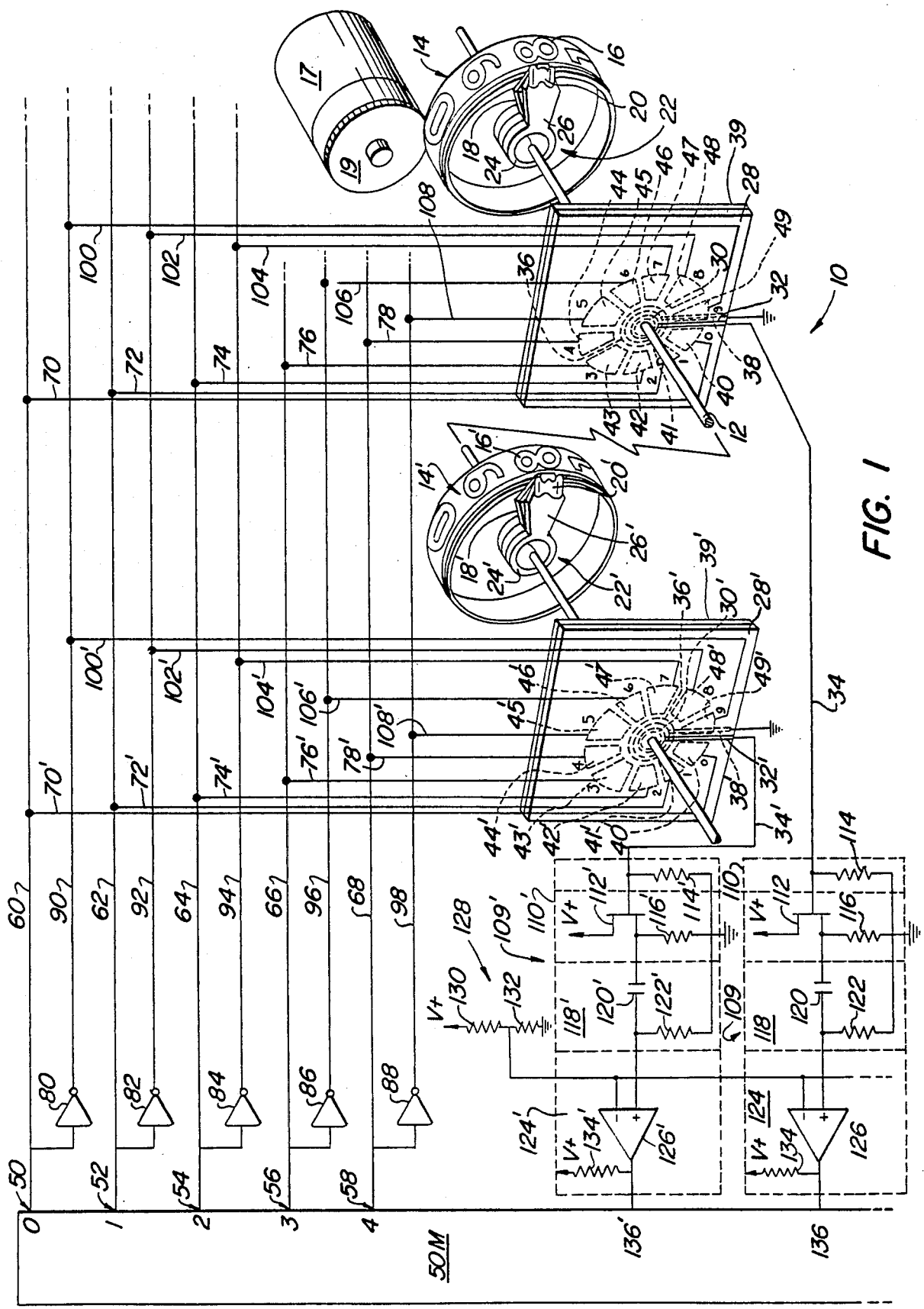
FIG. 1 is a schematic illustration of the circuitry and components of the position sensing apparatus constructed in accordance with this invention.

Referring now to FIG. 1, therein is shown the position sensing and controlling apparatus of the present invention generally designated by the numeral 10 which is used in an electrical demand meter (not shown).

The mechanical components of a conventional register include a plurality of number wheels on a common register shaft designated by the numeral 12. For the sake of simplicity, only two number wheels are shown, and similar parts have similar numbers with the addition of a prime notation. Thus, the first and second number wheels are designated by 14 and 14', respectively, which have numerals 16 and 16', respectively. The number wheels 14 and 14' are geared together by gears (not shown) in the conventional manner such that each wheel rotates one numeral for each complete revolution of the wheel to the right of it. The first number wheel 14 is conventionally driven by a stepping motor 17 with a gear 19 so that the numerals 16 are visible from the front of the meter through a window (not shown) only in discrete steps as the numeral "8" would be viewed in FIG. 1. In the preferred embodiment, the numerals 16 range from "0" to "9" so that ten possible numerals may be viewed from the front for each wheel.

The mechanical components of the position sensing and controlling apparatus 10 for one wheel 14 are typical of each of the wheels. A spring 18 is mounted on the hub of the wheel 14 to urge a movable electrode 22 axially away from the wheel 14. The movable electrode 22 is held fixed circumferentially by a holding tab 20 on the wheel 14 into which one end of the movable electrode is inserted. The movable electrode 22 has an annular portion 24 centered around the register shaft 12 and a wedge portion 26 disposed in a predetermined relationship relative to the numerals 16. The relationship, as would be evident to those skilled in the art, would be determined by the window position and the stationary electrodes which will later be described.

A fixed mounting plate 28 is located adjacent to the movable electrode 22. The mounting plate 28 has on its wheel adjacent side (far side as seen in FIG. 1) an annular, stationary, main electrode 30 which is substantially the same size as the annular portion 24 of the movable electrode 22 and which is similarly centered around the register shaft 12. The main electrode 30 is connected by a main electrode connection 32 to a main electrode lead 34.

An annular guard ring 36 is disposed outwardly of the main electrode 30 and is connected by a ground connection 38 to ground. In the preferred embodiment, the main electrode and ground connections 32 and 38 are parallel. The guard ring 36 surrounds and is coplanar with the main electrode 30 and prevents leakage currents from flowing from the later to be described coplanar, stationary electrodes to the main electrode as would happen under conditions of high humidity or with dirt on the mounting plate 28.

The mounting plate 28 also has ten wedge-shaped, stationary electrodes circumferentially disposed around the main electrode 30 which, starting from the main electrode connection 32 and going clockwise, correspond to the numerals "0" to "9" on the number wheel 14. The stationary electrodes for reference are marked with corresponding numerals "0" to "9" and are successively numbered 40 through 49. The stationary electrodes are each sized to be slightly larger than the wedge portion of the movable electrode 30 and are disposed such that strong capacitive coupling occurs when one of the circumferential stationary electrodes and the movable electrode are adjacently positioned.

In order to obtain strong, fixed value capacitive coupling between the movable and stationary electrodes, it is necessary that the gap between the electrodes be as small as possible while the dielectric constant across the gap be as high as possible to prevent arcing or shorting out across the gap. Further, the gap must be precisely held while being immune to contaminants either changing the gap or interferring with movement between the stationary and movable electrodes.

Air gaps as disclosed in the Wooster and Batz patents supra are unworkable for several practical reasons including the need for costly, precision bearing supports for the wheels and the need for greater signal strengths due to the relatively low dielectric constant of air.

After much investigation, it has been determined that the bonding of a high dielectric, low coefficient of friction material 39 to the stationary-electrode-containing surface of the support 28 will achieve the desired objectives. The spring 18 then urges the movable electrode 22 against the material 39 to maintain a constant gap.

In the preferred embodiment, the material 39 is Riston ® Photopolymer Dry Film Solder Mask 730FR material having a thickness of 3 mils. Riston is commercially available from E. I. DuPont De Nemours & Co., Wilmington, Del. 19898. It has a dielectric constant of 4.1 and meets Mil Std 202E method 110 for abrasion resistance to sand and dust contaminants.

Turning now to the electronics, the position sensing and controlling apparatus 10 in FIG. 1 includes a microprocessor 50M which acts as both the signal generator, receiver and controller. In the preferred embodiment, the microprocessor 50M is a Fairchild type F3870 microprocessor, available from Fairchild Camera and Instrument Corporation, 464 Ellis Street, Mountain View, Calif. 94042. Further details concerning this microprocessor and the programming thereof are given in a pamphlet entitled "F3870 MicroMachine II Fairchild Microcomputer Family" published by Fairchild Camera and Instrument Corporation and dated June 1978.

The microprocessor 50M is provided with output ports numerically designated sequentially from "0" to "4" which are numbered 50, 52, 54, 56, and 58 which have connected thereto primary signal leads 60, 62, 64, 66, and 68, respectively. These primary signal leads are respectively connected by secondary signal leads 70, 72, 74, 76, and 78 electrically to a mutually adjacent half of the stationary electrodes 40, 41, 42, 43, and 44. Similar secondary signal leads, designated by primes connect the corresponding stationary electrodes of number wheel 14' to the primary signal leads.

To provide signals to the remaining mutually adjacent half of the stationary electrodes, the primary signal leads 60, 62, 64, and 68 have connected thereto inverters 80, 82, 84, 86, and 88, respectively. The respective outputs of these inverters are respectively outputted along primary signal leads 90, 92, 94, 96, and 98 which are respectively connected by secondary signal leads 100, 102, 104, 106, and 108 to the stationary electrodes 49, 48, 47, 46, and 45, respectively.

The processing circuitry 109, which is duplicated for each wheel 14 etc., processes the signals on the main electrode lead 34. A resistor 114, in conjunction with the capacitance of the electrodes, provides a differentiated signal into a buffer circuit 110. The buffer circuit 110 includes an N-type Field Effect Transistor (FET) 112 with its gate connected to the main electrode lead 34 and the resistor 114, its drain connected to a positive supply source V+, and its source connected to ground by a resistor 116. The source of the FET 112 is further connected to DC component removal circuit 118. In the circuit 118, the FET 112 is connected to one plate of a capacitor 120 having its second plate connected to ground through a resistor 122. The second plate is further connected to a level detection circuit 124. In the level detection circuit 124, the capacitor 120 is connected to the positive input of a comparator 126. The negative terminal of the comparator 126 is connected to a potential divider 128 formed by resistors 130 and 132 between the positive supply source and ground. The output of the comparator 126 is connected to the positive supply source through a resistor 134 and to an input port 136 of the microprocessor 50M. Main electrode leads from other wheels would be connected to the input ports of the microprocessor 50M. From the second number wheel 14', the port is designated as 136.

Figure 2:
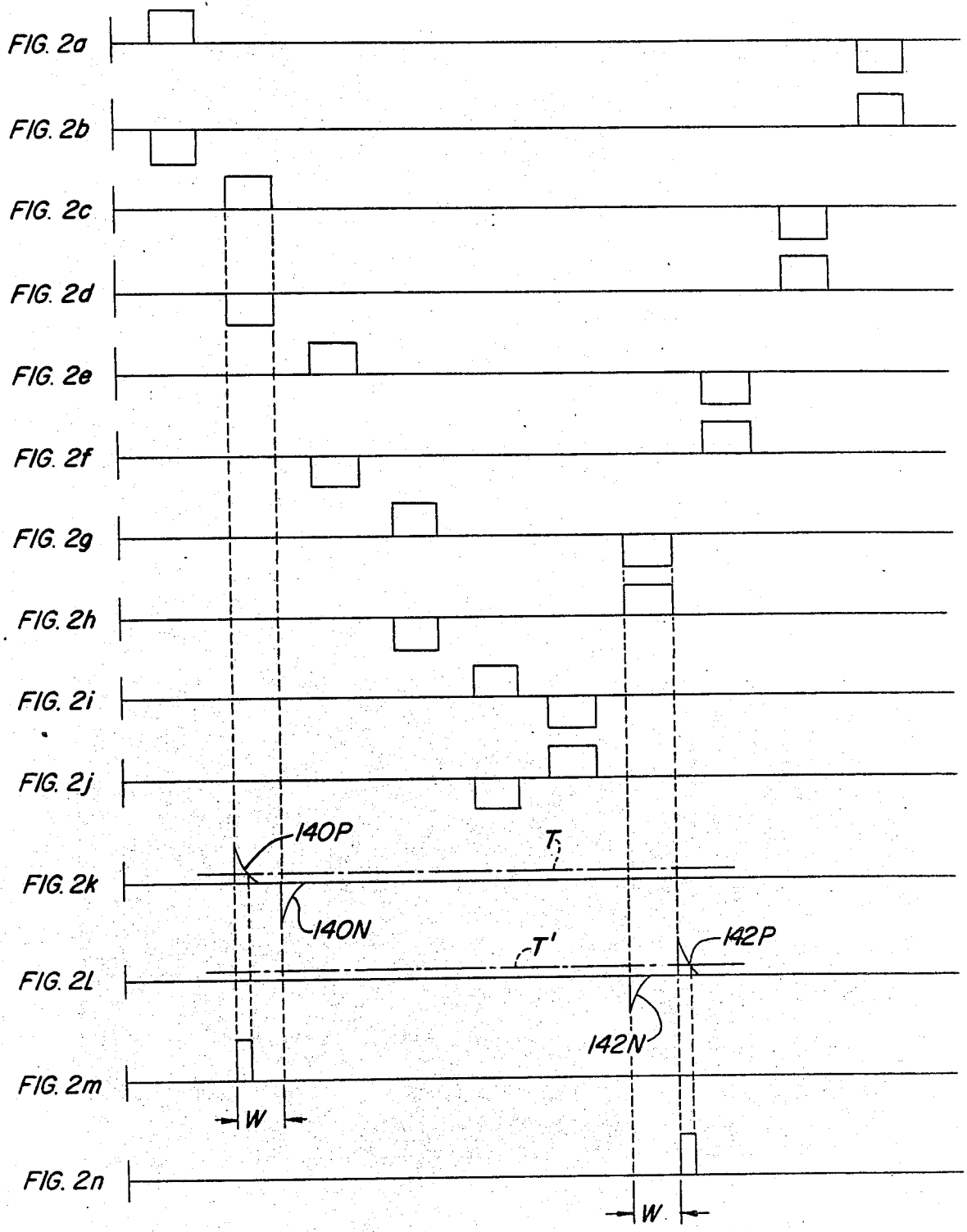
FIGS. 2a through 2n are the signal forms occurring in various portions of the circuitry of the present invention.

Referring now to FIGS. 2a-n, therein are shown the various signals plotted against time which occur during operation of the position sensing apparatus 10. FIGS. 2a, c, e, g, and i show the signal pulses which are respectively outputted from the microprocessor ports 50, 52, 54, 56, and 58 to leads 60, 62, 64, 66, and 68, respectively. FIGS. 2b, d, f, h, and j show the signal pulses which are respectively outputted from the inverters 80, 82, 84, 86, and 88 to the leads 90, 92, 94, 96, and 98 respectively.

Since the pair of signals on the leads 60 and 90, 62 and 92, 64 and 94, 66 and 96, and 68 and 98 are cotemporaneous, it may be seen that all the output port signals, which may be described as being "normal", have matching "inverted" signals. In the preferred embodiment, each of the signals is a pulse having a duration or width "W". These signals will be described in greater detail later.

Refer now to FIGS. 2k and l which show examples of signals which may be inputted to the buffer circuit 110 from the main electrode leads 34 and 34' respectively. It may be seen that a normal or positive pulse, for example the first pulse on the left as shown in FIG. 2c, when capacitive coupling occurs, will first produce a positive peaked pulsed 140P coinciding with the lead edge of the FIG. 2c pulse and then a negative peaked pulse 140N, coinciding with the trailing edge of the FIG. 2c pulse. For inverted or negative pulses, for example as shown in FIG. 2g, a negative peaked pulse 142N is first generated when capacitive coupling occurs, and then a positive level pulse 142P.

Referring now to FIGS. 2m and n, which show examples of two processed signals which may be outputted out of the level detection circuit 124 and 124' as a result of the respective outputs of the DC component eliminating circuit 118 and 118', and inputted for sensing into first and second wheel ports 136 and 136', respectively, of the microprocessor 50M. It will be seen that the level detection circuits 124 and 124' have a positive threshold shown in FIGS. 2k and 2l as T and T' which cause the FIGS. 2m and 2n pulses to be outputted to the microprocessor 50M.

Figure 3:
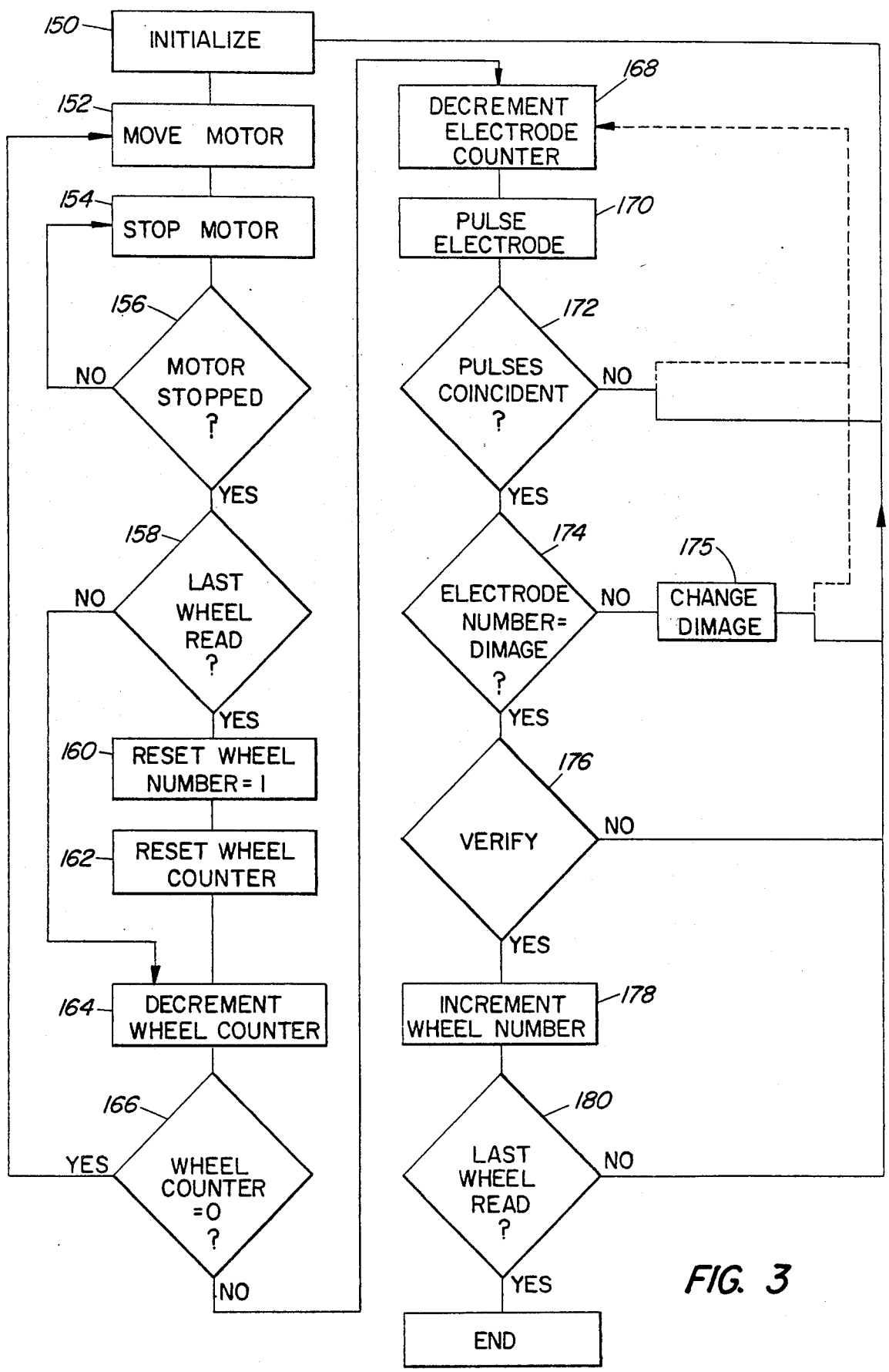
FIG. 3 is a block diagram of the program used in the microprocessor shown in FIG. 1.

Referring now to FIG. 3, therein is shown a block diagram of the program used in the microprocessor 50M which relates to the present invention. An initialize block 150 represents the main program in which the microprocessor 50M is initialized and performs the functions which are not otherwise a part of the present invention. Initially, commands given to the move motor block 152 cause the motor 17 to rotate and drive the wheels 14 and 14' via the drive gear 19 in accordance with electricity demand sensed by the meter in which this apparatus is used. After the desired amount of movement has been obtained, the microprocessor 50M provides the command at a stop motor block 154 to stop the motor 17. The condition of the motor is then checked in the motor stopped block 156. If the motor is not stopped, the program returns to the stop motor block 154; if the motor is stopped, the program progresses to the last wheel read block 158.

In the last wheel read block 158, it is determined whether the last wheel (the second number wheel in the present description) to be read has been read. If the last wheel has been read, the program progresses to the reset wheel number equal to block 160 and then to the reset wheel counter block 162.

In the preferred embodiment the wheel counter is a century counter which is reset initially to "100" and which can be decremented down to "0" during each iteration of the program. The wheel counter is decrementable from "100" to "0" for ease of sensing the end point with the particular being used microprocessor. The counter could also be incrementable if desired.

The program then progresses from the reset wheel counter block 162 to the decrement wheel counter block 164. Similarly, if the last wheel has not been read in the block 158, the program will come directly to this block 164 from block 158. From the decrement wheel counter block 164, the program proceeds to the wheel counter equal to zero decision block 166. In block 166 it is determined whether or not the wheel counter has reached zero. If the wheel counter has reached zero, this indicates that the last wheel has not been read for 100 iterations of the program. This would indicate that one of the wheels 14 or 14' is not in the proper position to be read. Therefore, the program returns to the move motor block 152 to control the motor and cause it to rotate a set amount and the program reiterated until the last wheel may be read. While the wheel counter has not reached zero, the program will iterate and proceed to decrement electrode counter block 168.

Taking a simplified overview of a portion of the preferred embodiment of the present invention, the microprocessor could be said to be checking each electrode of the wheel which is to be read ten times and then moving the motor and rechecking ten times until all the wheels can be read.

The electrode counter in the microprocessor 50M is a decade counter which contains the number of the last electrode which had been pulsed during the previous program iteration. The electrode counter is decrementable from "9" to "0" although it could have just as easily been incrementable.

After the electrode counter has been decremented in block 168, the program proceeds to pulse electrode block 170 in which a look up table in the microprocessor memory is utilized to output from the microprocessor 50M a pulse having a configuration similar to one of those in FIGS. 2a through j to the circumferential electrodes indicated by the electrode counter.

The program then proceeds from the pulse electrode block 170 to a pulses coincident decision block 172 in which a check is made to see whether or not a pulse is coincident in the one of the input ports 36a or b which the microprocessor is sensing while pulses are being outputted from the "0" to "4" ports of the microprocessor 50M. If the pulses are not coincident, in the preferred embodiment the program returns to the initialized block 150 to implement other operations not related to the present invention before reiterating the FIG. 3 program. As would be evident to those skilled in the art, it would also be advantageous for the program to return via the dotted line shown in FIG. 3 to the decrement electrode counter block 168 to speed up the program if only the apparatus of the present invention were involved.

If there is an output pulse from the microprocessor coincident with a processed input pulse at the correct input port, the program proceeds to the electrode number equals Dimage decision block 174. In the block 174, the electrode number from the electrode counter is compared with the electrode number in microprocessor memory (called "Dimage") from the prior program iteration. If the two electrode numbers do not match, the memory Dimage is changed by the program step in change Dimage block 175 and the program returns in the preferred embodiment to the initialize block 150 or alternatively may be returned to the decrement electrode counter block 168. If the electrode numbers are the same, the program proceeds to verify decision block 176 where the correspondence between the electrode counter number and Dimage are verified by waiting until the two correspond for three iterations of the program.

From the verify block 176 the program may return again to the initialized block 150 if the correspondence is not verified or to the increment wheel number block 178 for the microprocessors wheel number counter to be incremented by "1" if it is.

From the increment wheel number block 178 the program will progress to the last wheel read block 180 to determine if the second number wheel 14' has been read. If it is not the program returns to the initialized block 150 and if it does the program ends for the purposes of this invention although it is likely that the program will return to the initialize block 150 for further operations not related to the present invention.

The following are examples of the operation of the positioning sensing and controlling apparatus 10. Initially the microprocessor 50M initializes the memory and outputs as well as the other conditions necessary for operation of other features which are not part of the present invention. The microprocessor 50M then proceeds to command the motor 17 to rotate the wheels 14 and 14' into a position giving a reading corresponding to the electricity meter reading. The program in the stop motor block 154 then stops the motor and the motor is checked in block 156 to make sure that it is stopped. Once it is assured that the motor is stopped, a check is made to see if the last wheel has been read by checking the wheel number. Assuming that the last wheel to be read will be the second wheel 14', if the wheel number is still "1" indicating the first number wheel 14 was the most recent wheel read, the program will proceed from the decision block 158 to the decrement wheel counter block 164 to decrease the wheel counter by "1" count from "100".

If the wheel counter is not equal to "0" as checked in decision block 166, the program will proceed to block 168 where the electrode counter will be decremented by "1" from the number previously placed in the electrode counter during the previous program iteration.

The microprocessor 50M acting according to pulse electrode block 170 will provide a pulse determined from an internal memory lookup table to one of the output ports 50, 52, 54, 56, or 58. Assuming that the number "2" electrode 42 is to receive a pulse according to the electrode counter, an output pulse as shown in FIG. 2c will be provided from the first output port 52. This will be a normal pulse to the number "2" electrode 42 which will be simultaneously provided through the inverter 82 as the FIG. 2d inverted pulse to the number "8" electrode 48.

After the pulse is sent, the program proceeds to the decision block 172 where a check is made to see if there is a processed pulse in the input port 136 coincident with the FIG. 2c pulse. If there is no processed pulse coincident, the program returns to the initialized block 150, moves the motor if necessary to match the meter reading, stops the motor, checks to make sure the motor is stopped, checks to make sure the last wheel has been read, and then decrements the wheel counter in block 164, and then proceeds to the decision block 166.

If the wheel 14 is not in such a position where the movable electrode 22 is positioned over one of the circumferential electrodes, the wheel counter will eventually decrement from "100" to "0" and the program will return to move motor block 152 to cause the motor to move a predetermined amount until the movable electrode 22 will be adjacent to one of the stationary electrodes 40-49.

When the movable electrode 22 is adjacent to a stationary electrode such as 42, a signal will be capacitively coupled between the stationary electrode 42, the movable electrode 22, and the main stationary electrode 36. As a result of the RC circuit of the capacitors, formed by the electrodes, and the resistor 114, the signal into the FET 112 will be a differentiated signal as shown in FIG. 2k where a positive peak pulse 140P is coincident with the leading edge of the FIG. 2c pulse and a negative peaked pulse 140N is coincident with the trailing edge. This signal is buffered in the buffer circuit 110 and the DC components removed in the DC component removal circuit 118. The output of the circuit 118 is inputted into level detector 124 which has a positive detection threshold as indicated by T in FIG. 2k. While the peak pulse 140P is above the threshold, the output of the level detection circuit 124 will be the pulse as shown in FIG. 2m. Since the pulse in FIG. 2m will fall within the period indicated by W which is the width of the FIG. 2c pulse, the decision block 172 will indicate the coincidence of the pulses.

When pulses are coincident, the program will proceed to the decision block 174 where the electrode number will be compared with the previous electrode number in Dimage to determine if they are the same. Dimage contains the indication of the readable wheel numbers and may be readout if the register reading is desired.

Assuming that there has been a change in the meter reading and thus in the wheel readings, the electrode number will not equal the number in Dimage. The program will then proceed to the change Dimage block 175 and the new electrode number will be inserted in Dimage. The program will then proceed back to the initialized block 150 and thence through the entire program until it returns to the decision block 174 where a comparison is again made of the electrode number with the Dimage number. This time the electrode number should equal the number in Dimage and the program should pass to the decision block 176 where a check is made to see if this correspondence has occurred a certain number of times; in the preferred embodiment, three times. Thus, the program is reiterated three times to verify that the electrode number has not changed.

Once it is verified that the number in Dimage is the electrode number, the program proceeds to the increment wheel number block 178 where the wheel number is incremented. While it is obvious that there may be any number of other wheels, in the example shown in FIG. 1, the wheel number will be incremented to "2" which would be the wheel 14'.

It should be noted that the effect of incrementing the wheel number on the microprocessor 50M will be to make it responsive only to outputs from the processing circuitry of the particular wheel. For example, in this example, the microprocessor 50M now will only sense outputs from the processing circuitry 109' (the second number wheel) into port 136'. The program will next proceed to the decision block 180 and reiterate until the second number wheel has been read. When it is sensed that the last wheel has been read, the program will then end for purposes of the present invention.

During the next program iteration, the initial parts of the program will be the same until the last wheel read block 158 is reached. At this point the program will indicate that the last wheel was read in the previous iteration and will reset the wheel number equal to "1" in the reset wheel number block 160. Subsequently, the program will proceed to block 162 where the wheel counter will be reset to "100" and then the program proceeds as previously described above.

Taking a simplified overview of a portion of the preferred embodiment of the present invention, the microprocessor continuously provides signals sequentially to the circumferential electrodes and switching the sensing for a processed signal from one wheel to another after the two signals coincide.

As also previously described above, in order to avoid undesirable capacitive coupling, it is necessary to provide an inverted pulse to a symmetrically corresponding stationary electrode when one stationary electrode is provided with a positive pulse. When the look up table in the microprocessor 50M indicates that a positive pulse should be provided to the sixth stationary electrode 46, the pulse electrode command at 170 will cause a inverted pulse to be provided out of the third output port 56. This output pulse will be converted into a normal pulse by the inverter 86. However if the movable electrode 22 is adjacent the third stationary electrode 43, the negative pulse will be capacitively coupled to the lead 34. To avoid an erroneous reading, the pulses coincident block 172 is provided. As seen in FIG. 2g and 2l the negative pulse in FIG. 2g will be differentiated through the capacitance of the sensor and the resistor 114 to provide a negative peaked pulse 142 and coincident with the leading edge of the pulse and a positive peak 142P coincidence with the trailing edge. As shown in FIG. 2l since the positive threshold will only allow a pulse as shown in FIG. 2n with a positive peaked pulse 142P, the pulse in FIG. 2n will not be coincident with the duration W of the FIG. 2g pulse. Thus, in this situation an indication will be given that no pulses are coincident.

As many possible embodiments may be made of the invention without departing from the scope thereof, it is to be understood that all matter set forth herein or shown in the accompanying drawings as to be interpreted in an illustrative and not a limiting sense.

What is claimed is:

1. Position sensing and controlling apparatus comprising:
    a stationary main electrode;
    a stationary first electrode spaced from said main electrode;
    a stationary second electrode spaced from said main and first electrodes;
    a movable electrode positionable proximate to and capacitively coupled with said main and first electrodes or said main and second electrodes;
    driving means for causing movement of said movable electrode;
    processing means connected to said main electrode responsive to a capacitively induced signal in said main electrode for providing a processed signal; and
    processor means operatively connected to said driving means, said stationary electrodes, and said processing means,
    said processor means including signalling means for providing a first or second signal respectively to said first or second electrode whereby a signal is capacitively induced in said main electrode when said movable electrode is respectively proximate to said first or second electrode;
    said processor means including control means for causing said signalling means to provide said first signal and sensing the presence of said processed signal to provide an indication that said movable electrode is proximate to said first electrode when said first signal is coincident with said processed signal and sensing the lack of said processed signal to cause said signalling means to provide said second signal and sense the presence of said processed signal to provide an indication that said movable electrode is proximate to said second electrode when said second signal is coincident with said processed signal;
    said processor means including means responsive to the lack of said processed signal which indicates said movable electrode is not proximate to said second electrode for providing a signal indication thereof;
    said processor means including means connected to said driving means responsive to the signal indication that said movable electrode is not proximate to said second electrode for causing said driving means to move said movable electrode.

2. The apparatus as claimed in claim 1 wherein said procesor means includes means for stopping said driving means after said movable electrode has moved a predetermined amount and means for assuring that said driving means has stopped after the predetermined amount.

3. The apparatus as claimed in claim 1 wherein said processor means includes means responsive to a predetermined number of signal indications for causing said driving means to move said movable electrode.

4. Position sensing and controlling apparatus comprising:
    first and second stationary main electrodes;
    first and second pluralities of stationary circumferential electrodes respectively surrounding and spaced from said first and second main electrodes;
    first and second movable electrodes respectively capacitively coupled to said first and second stationary main electrodes and said first and second pluralities of stationary circumferential electrodes;
    means interconnecting said first and second movable electrodes for causing said first movable electrode to move a predetermined amount after said second movable electrode has moved a predetermined amount;
    motor means for moving at least one of said first and second movable electrodes;
    first and second processing means respectively connected to said first and second main electrodes for providing a processed signal when one of said pluralities of circumferential electrodes is provided with a signal which is capacitively coupled through said first or second movable electrode to said first or second main electrode; and processor means operatively connected to said motor means, said first and second pluralities of stationary circumferential electrodes, and said first and second processing means;

said processor means including signalling means for providing signals sequentially to said first and second pluralities of circumferential elctrodes;

said processor means including means for sensing one of said first and second processing means and responsive to a processed signal coincident with said signalling means signal to determine which one of said plurality of circumferential electrodes said movable elctrode is proximate to and subsequently sensing the other of said processing means;

said processor means including means responsive to the signalling of all of said plurality of circumferential electrodes by said signalling means and to the lack of a processed signal developed therefrom for providing a motor signal;

said processor means including motor controlling means responsive to the motor signal for causing said motor means to move at least one of said movable electrodes.

5. The apparatus as claimed in claim 4 wherein said processor means includes means for stopping said motor means after at least one of said first and second movable electrodes has moved a predetermined amount corresponding to the circumferential distance between two of said plurality of circumferential electrodes and means for assuring that said motor means is stopped.

6. The apparatus as claimed in claim 4 wherein said motor controlling means includes means responsive to a predetermined number of motor signals for causing said motor means to move said plurality of circumferential electrodes.

7. Position sensing and controlling apparatus comprising:
a plurality of stationary main electrodes;
a plurality of stationary circumferential electrodes surrounding and spaced away from each of said plurality of main electrodes;
a plurality of movable electrodes for each of said plurality of main electrodes and capacitively coupled thereto and to said circumferential electrodes when proximate thereto;
means interconnecting said plurality of movable electrodes for causing each of said plurality of movable electrodes to move a predetermined amount upon a predetermined amount of movement of another of said plurality of movable electrodes;

motor means connected to at least one of said plurality of movable electrodes for causing movement thereof;
a plurality of processing means connected to said plurality of main electrodes for providing processed pulses representative of noninverted pulses capacitively coupled to said plurality of main electrodes;
processor means operatively connected to said plurality of circumferential electrodes, to said plurality of processing means, and to said motor means,
said processor means including signalling means for providing to said plurality of circumferential electrodes a sequence of noninverted pulses, said processor means including:
(a) sensing means for selectively sensing a processed signal from the selected one of said plurality of processing means,
(b) processed signal responsive means responsive to a processed signal from the selected one of said plurality of processing means coincident with said signal from said signalling means to determine which one of said plurality of circumferential electrodes is proximate to said movable electrode,
(c) said processed signal responsive means being further responsive to the determined one of said plurality of circumferential electrodes to which said movable electrode is proximate to for selecting another one of said plurality of processing means,
(d) means responsive to the selection of another one of said plurality of processing means for providing a control signal, and
(e) motor controlling means responsive to said control signal for causing movement of said motor means.

8. The apparatus as claimed in claim 7 wherein said processor means includes means further for stopping said motor after one of said plurality of movable electrodes has moved a predetermined amount and means for assuring that said motor is stopped.

9. The apparatus as claimed in claim 7 wherein said processor means includes counter means for counting a number of signal generated by said signalling means prior to reception by said processed signal responsive means of a coincident processed signal and means responsive to a predetermined count for causing said control signal to be provided.

* * * * *